Sept. 1, 1931.  A. KALTENBRUNN  1,821,714
CONVEYER
Filed June 10, 1929   2 Sheets-Sheet 1

Anna Kaltenbrunn, Inventor
By C A Snow & Co.
Attorneys.

Sept. 1, 1931. A. KALTENBRUNN 1,821,714
CONVEYER
Filed June 10, 1929 2 Sheets-Sheet 2
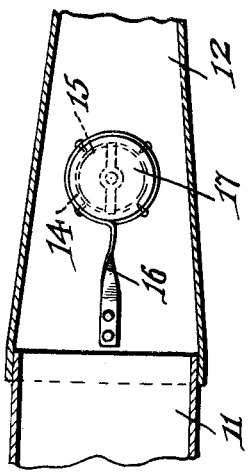
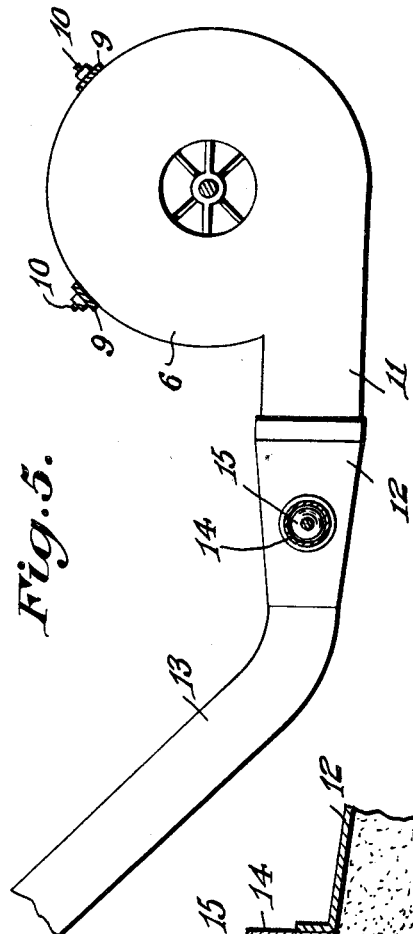
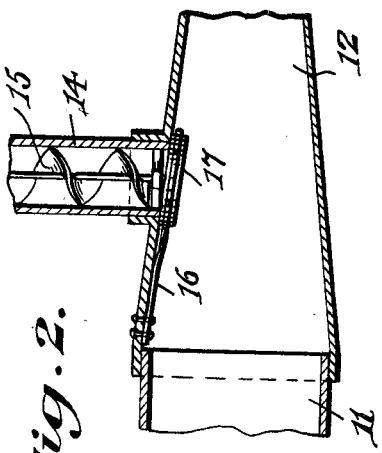
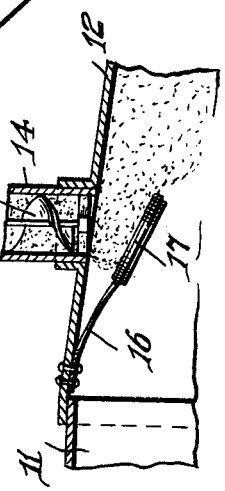
Anna Kaltenbrunn, Inventor Patented Sept. 1, 1931

1,821,714

UNITED STATES PATENT OFFICE

ANNA KALTENBRUNN, OF ST. NAZIANZ, WISCONSIN

CONVEYER

Application filed June 10, 1929. Serial No. 369,718.

This invention has reference to threshing machines, the primary object of the invention being to provide pneumatic means for discharging the grain into the granary or other place of deposit for the threshed grain.

An important object of the invention is to provide means whereby the passageway or spout through which the grain is delivered to the discharge pipe, will be closed at predetermined intervals, or when a certain quantity of grain has passed from the spout, so that the air from the blower will not cause a back pressure in the spout to cause the grain to clog.

A still further object of the invention is to provide an attachment of this character which may be readily and easily installed on threshing machines now in use, eliminating the necessity of making alterations in the threshing machine construction to install the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a fragmental sectional view through the delivery spout and blower spout.

Figure 3 is a sectional view taken at right angles to Figure 2.

Figure 4 is a fragmental sectional view through the delivery spout and blower spout, the automatic closure being shown in its open position.

Figure 5 is a sectional view taken on line 5—5 of Figure 1.

Figure 1:
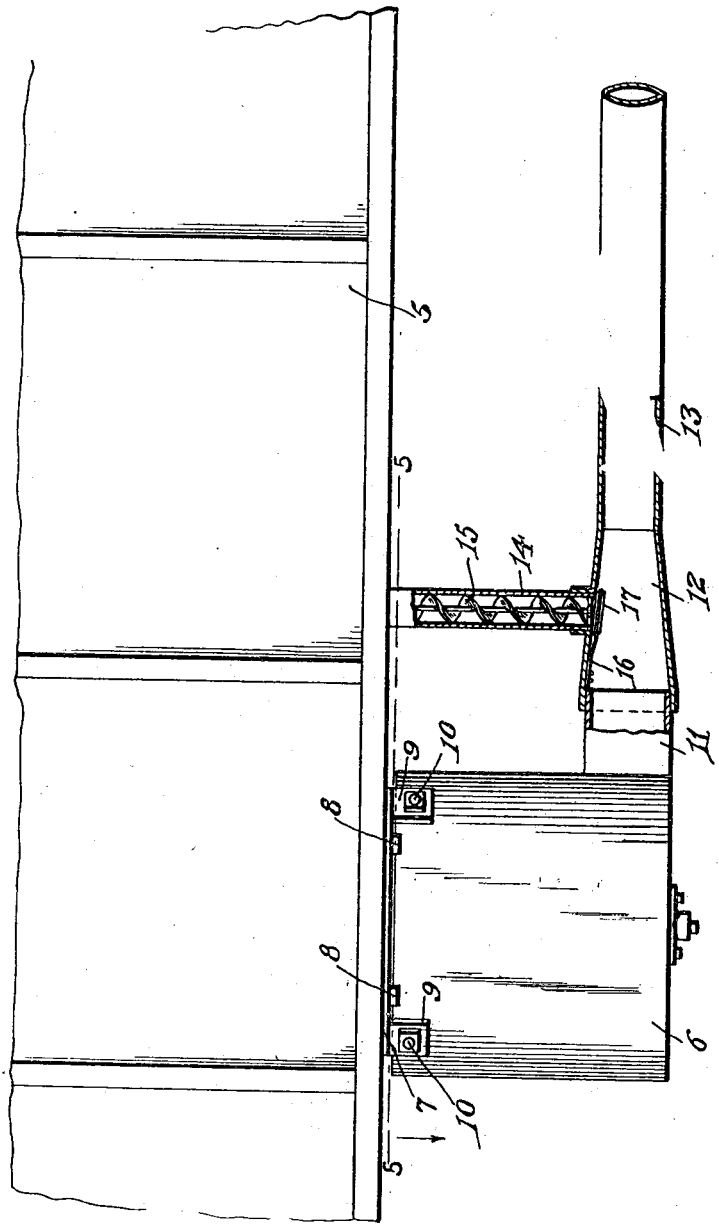
Figure 1 is a fragmental plan view of a threshing machine showing an attachment constructed in accordance with the invention, as positioned thereon.

Referring to the drawings, the reference character 5 designates the body portion of a threshing machine, to which the attachment forming the subject matter of this invention, is secured.

The attachment comprises a blower housing 6 secured to the threshing machine frame, by means of the bracket 7 which is bolted to the threshing machine frame by means of the bolts 8. Flanges 9 extend laterally from the bracket and are provided with openings to receive the bolts 10 which also pass through openings in the blower housing 6. The blower housing 6 includes a pipe 11, to which the tapered pipe section 12 is secured, which pipe section 12 forms a part of the blower pipe or discharge pipe, the extension 13, which also forms a part of the blower pipe being of any desired length.

The reference character 14 designates the delivery spout which communicates with the threshing machine to receive the grain after it has passed through the various beaters and screens of the threshing machine. A worm indicated at 15 operates in the delivery spout and acts to feed the grain laterally into the pipe section 12. Secured within the pipe section 12, is a spring arm 16 that carries a disk like closure 17 at its free end, the disk like closure being of a diameter to fit over the discharge end of the delivery spout 14, so that under normal conditions, that is when no pressure is exerted against the inner surface of the closure 17, the action of the spring supporting arm 16 will be to close the opening; however the closure 17 will move to its open position, or to a position as shown by Figure 4 of the drawings, under the pressure of the grain being forced through the delivery spout 14, by the worm conveyer.

It is of course obvious that as the grain is fed into the blower pipe, the blast of air passing through the blower pipe will pick up the grain and carry the grain through the blower pipe where it may be discharged into the granary or place of storage.

I claim:

In a device of the character described, a main pipe section, a tapered pipe section communicating with the main pipe section, a delivery spout disposed laterally of the tapered pipe section and communicating therewith, a spring arm secured within the tapered pipe section, a disk-like closure at the free end of the arm and adapted to normally close one end of the delivery spout, a spiral conveyer within the delivery spout for forcing grain against the disk-like closure to force the closure to its open position, and means for directing a blast of air through the main pipe and tapered pipe section, to pick up grain and carry grain through the tapered pipe section.

In testimony that I claim the foregoing as my own, I have hereto affixed my signature.

ANNA KALTENBRUNN.